(12) United States Patent
Bischoff et al.

(10) Patent No.: US 11,651,145 B2
(45) Date of Patent: May 16, 2023

(54) DOCUMENT TRANSFORMATION BETWEEN PROGRAM FORMATS AND TEMPLATES SYSTEM AND METHOD

(71) Applicant: Pro Quick Draw LLC, St. Paul, MN (US)

(72) Inventors: Andrew Erich Bischoff, Baltimore, MD (US); Troy Bigelow, Fort Mill, SC (US)

(73) Assignee: Pro Quick Draw LLC, St. Paul, MN (US)

(*) Notice: Subject to any disclaimer, the term of this patent is extended or adjusted under 35 U.S.C. 154(b) by 0 days.

(21) Appl. No.: 17/733,904

(22) Filed: Apr. 29, 2022

(65) Prior Publication Data

US 2022/0253590 A1 Aug. 11, 2022

Related U.S. Application Data

(60) Division of application No. 17/148,869, filed on Jan. 14, 2021, which is a continuation-in-part of
(Continued)

(51) Int. Cl.
*G06F 16/16* (2019.01)
*G06F 40/106* (2020.01)
(Continued)

(52) U.S. Cl.
CPC .......... *G06F 40/151* (2020.01); *G06F 16/168* (2019.01); *G06F 40/106* (2020.01); *G06F 40/117* (2020.01)

(58) Field of Classification Search
CPC .... G06F 40/151; G06F 40/117; G06F 40/106; G06F 16/168
See application file for complete search history.

(56) References Cited

U.S. PATENT DOCUMENTS 6,026,416 A * 2/2000 Kanerva ................. G06F 16/93
715/208
6,202,061 B1 3/2001 Khosla
(Continued)

OTHER PUBLICATIONS

Oct. 28, 2020 USPTO Office Action (U.S. Appl. No. 16/793,594)—Our Matter 6141.
(Continued)

*Primary Examiner* — Andrew T Chiusano
(74) *Attorney, Agent, or Firm* — Forsgren Fisher; Daniel A. Tysver; James M. Urzedowski

(57) ABSTRACT

A system and method are presented for interoperability of computer software applications. Subdocuments are located within slots of a main document along with a fully-qualified file identifier. Subdocuments can be saved in the main document in an intermediate format. Editing a slot triggers the opening of the original document in its native application. An intermediate format file is then created and reimported into its original slot. A document containing subdocuments can be exported in its entirety from one program to another. An auxiliary program identifies a target template format and converts the original document to the target template in its native application using the original subdocuments. Page image exports are used to transfer all content in the original application document to a destination document in a different format.

17 Claims, 12 Drawing Sheets

Related U.S. Application Data application No. 16/793,594, filed on Feb. 18, 2020, now Pat. No. 11,307,732.

(60) Provisional application No. 62/807,105, filed on Feb. 18, 2019.

(51) Int. Cl.
*G06F 40/151* (2020.01)
*G06F 40/117* (2020.01)

(56) References Cited

U.S. PATENT DOCUMENTS

| | | | |
|---|---|---|---|
| 7,139,095 B1 | 11/2006 | Hunter | |
| 11,449,469 B2* | 9/2022 | Emerick | G06F 16/1734 |
| 2004/0057064 A1 | 3/2004 | Stringham | |
| 2008/0288590 A1 | 11/2008 | Lynch | |
| 2009/0327209 A1* | 12/2009 | Dunietz | G06Q 10/06 |
| | | | 707/E17.127 |
| 2010/0318897 A1* | 12/2010 | Wang | G06F 40/123 |
| | | | 715/234 |
| 2012/0110439 A1 | 5/2012 | Rosner | |
| 2012/0154608 A1 | 6/2012 | Ko | |
| 2012/0162266 A1* | 6/2012 | Douglas | G06T 11/60 |
| | | | 345/677 |
| 2013/0254656 A1* | 9/2013 | Florian | G06F 40/166 |
| | | | 715/255 |
| 2013/0316837 A1 | 11/2013 | Coiner, Jr. | |
| 2013/0346874 A1 | 12/2013 | Wallace | |
| 2014/0101310 A1* | 4/2014 | Savage | G06Q 10/10 |
| | | | 709/224 |
| 2015/0112927 A1* | 4/2015 | Lee | G06F 16/178 |
| | | | 707/610 |
| 2016/0193530 A1 | 7/2016 | Parker | |
| 2016/0283085 A1* | 9/2016 | Beausoleil | G06F 16/168 |
| 2016/0292135 A1* | 10/2016 | Mowatt | G06F 40/186 |
| 2018/0005544 A1 | 1/2018 | Molenje | |
| 2018/0129634 A1 | 5/2018 | Sivaji | |
| 2019/0050420 A1* | 2/2019 | Miranda-Steiner | G06F 16/178 |
| 2019/0163970 A1 | 5/2019 | Yu | |
| 2019/0179876 A1* | 6/2019 | Zhang | G06F 40/169 |
| 2020/0201823 A1* | 6/2020 | Meschkat | G06F 16/178 |
| 2020/0201918 A1* | 6/2020 | Karande | G06F 16/957 |
| 2020/0293169 A1* | 9/2020 | Hu | H04L 67/565 |
| 2021/0354017 A1 | 11/2021 | Friehauf | |

OTHER PUBLICATIONS

Jun. 10, 2021 USPTO Office Action (U.S. Appl. No. 16/793,594)—Our Matter 6141.

* cited by examiner

DOCUMENT TRANSFORMATION BETWEEN PROGRAM FORMATS AND TEMPLATES SYSTEM AND METHOD

CROSS-REFERENCE TO RELATED CASES

The present application is a continuation-in-part of U.S. patent application Ser. No. 16/793,594, filed on Feb. 18, 2020, which in turn claimed the benefit of U.S. provisional patent application 62/807,105, filed on Feb. 28, 2019. Both of these applications are hereby incorporated by reference in their entireties.

FIELD OF THE INVENTION

The present application relates to the field of interoperability between computer software applications. More specifically, the application relates to the utilization of embedded sub-documents within slots that are defined in a main document, and the cross-exportation and live editing of subdocuments between applications having different file formats.

SUMMARY OF THE INVENTION

The present invention is configured to operate on a computer system in which two applications utilize different file formats. Each application is able to create files in their own format. These files contain slots into which the content of subfiles (or "subdocuments") have been embedded. In one embodiment, the same intermediate file format is used by both programs. This intermediate file format can be handled by either program, but only in a simplified manner. The content contained within the slots can be formatted in this intermediate file format, which is then stored within slots in association with a file name that identifies where the full subfile (or "subdocument file") is stored in a file system. The full (original) subfile is stored in the native format of one of the two programs.

Templates are utilized to create native format documents in one of the programs that establish the locations of slots within the document. Templates generally define the number, orientation, and relative size of the slots on each page or slide. The slots themselves can include title and count fields.

Auxiliary programming operates alongside the two programs in order to handle templates, document creation, the identification of subdocuments, and the creation, insertion, and automatic deletion of temporary intermediate file formats that are derived from the originally formatted subdocument files. Auxiliary programming can be created using application programming interfaces (APIs) provided by the main programs.

In one embodiment, the two programs are created by the same software developer. An example of this type of embodiment is a system that operates on Visio, a vector graphics processing program from Microsoft, Inc. (Redmond, Wash.), and PowerPoint, a slide-based presentation program also from Microsoft. While Visio and PowerPoint are both graphics based programs, they use separate file formats that are not interchangeable. One embodiment that operates on Visio and PowerPoint uses Enhanced MetaFiles (or EMFs) as the intermediate file format. While both Visio and PowerPoint can import and export EMF formatted documents, the EMF format is an image file format that does not provide support for many of the specific features that are support by the Visio or the PowerPoint file formats.

A document having multiple subdocuments can be exported in its entirety from one program (the source program) to the other program (the target program). To accomplish this, the auxiliary program must identify a target template format that will define the overall look of the document created in the target software program. The target template format may have a different layout or structure than the template used to format the document in the source program. A new document using the target template format is created in the source program, with slots in this new document being filled by reexamining the source subdocument files. The auxiliary programming then exports the pages/slides of the new document in their entirety into stripped-down intermediate format documents. These intermediate format documents are formatted according to the target template, and there can be imported directly into the destination program.

DETAILED DESCRIPTION

System 10

Figure 1:
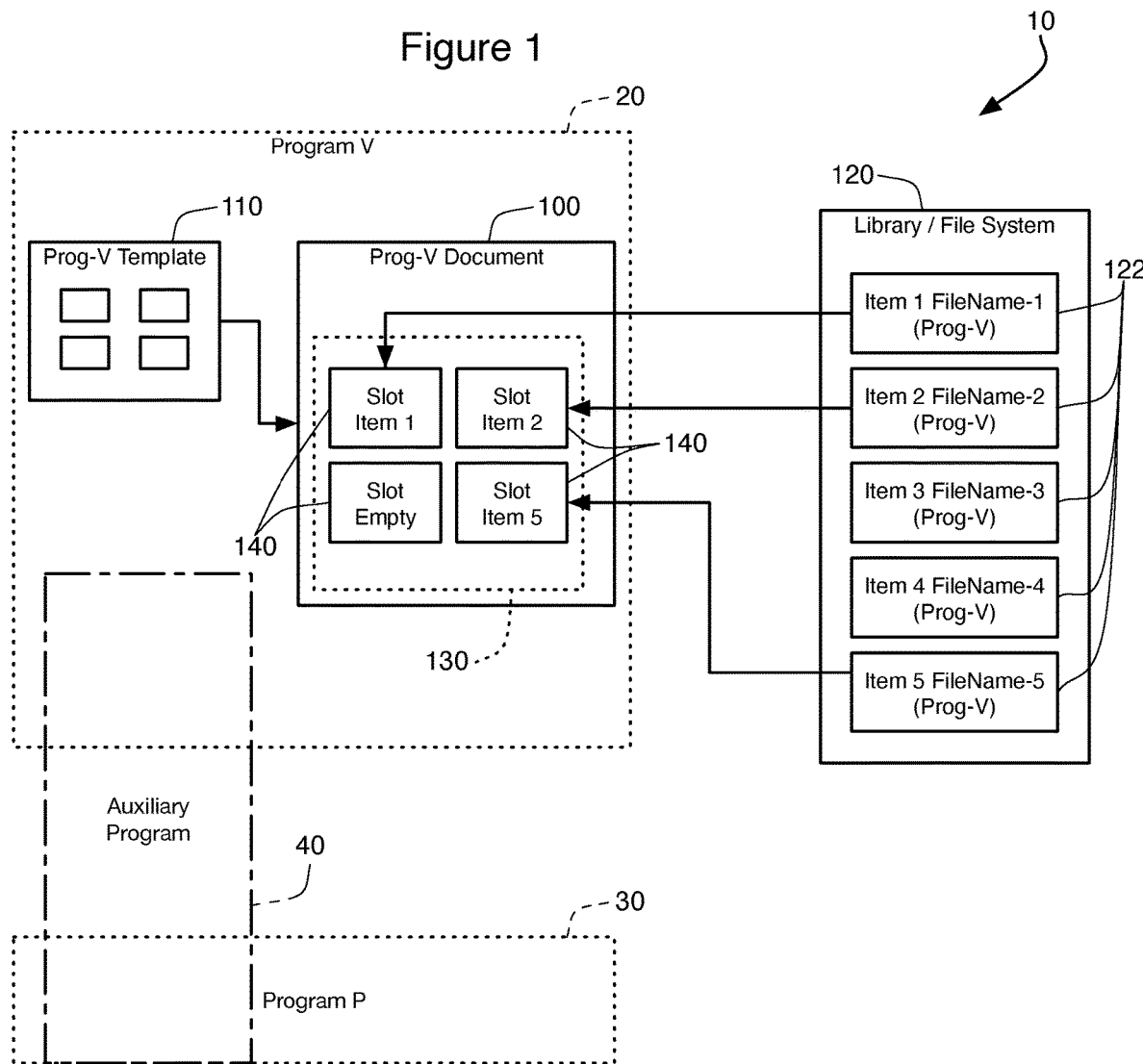
FIG. 1 is a schematic diagram of a system utilizing the present invention.

FIG. 1 shows a system 10 in which a document 100 is created in a first program 20. The system 10 operates on one or more computer systems. These computer systems operate through the use of a central processor (or CPU) under the direction of programming. The programming is generally stored in static, nonvolatile storage or memory, such as a solid state drive (or SSD). Programming used by the central processor is generally retrieved from the nonvolatile storage and placed into faster, yet volatile random access memory (or RAM). Programming is sometime provided by third party software vendors in the form of commercial software programs. Because programs frequently work together, and can be supplemented by custom programming, it is sometimes difficult to separate one program from another. In the present context, separate programming generally is capable of operating independently for a particular purpose, but nonetheless is able to share data and communicate instructions with other programming. Data is also stored on the nonvolatile memory and then moved into RAM during processing. Data is frequently stored as files in a file system, such as file system 120. Documents are files that are created, edited, and stored by programming. Documents are typically stored in document formats that have been created by the programming that saved that document onto nonvolatile storage. Documents created by one program may not be fully useable or even readable by other programs.

In FIG. 1, the first program 20 is labeled Program-V. In the priority applications, portions of system 10 were described explicitly with the first program being Microsoft Visio, and the second program being Microsoft PowerPoint. The present invention is generally applicable to many combinations of different programs, but in keeping with some of that original description, first program 20 is labeled, and sometimes referred to herein as program V. Similarly, the second program 30 shown in FIG. 1 is labeled program P, although it is not to be limited to Microsoft PowerPoint.

The document 100 is created using a format identified by a separate template 110. In FIG. 1, the template 110 is shown as having four locations which can be referred to as "tiles," "slots," or "containers." The priority document frequently used the word tile, while the present application more frequently uses the term slot. In Visio, a slot can take the form of multiple shapes grouped into a container. The four slots in the template 110 are shown in a 2×2 grid format, with each slot in a generally landscape orientation. Other templates may have a different grid pattern of slots, such as a 2×1 grid, a 3×2 grid, a 4×2 grid, etc. Even a single slot per page can be considered a 1×1 grid pattern.

Since document 100 is created according to template 110, document 100 is also shown as having a 2×2 grid of slots 140, with each slot 140 also in a landscape orientation. The document 100 can be composed or one or more pages or slides, such as page 130. In the present disclosure, documents such as document 100 that are created by program V 20 will be considered to have pages while documents created by program P 30 will be considered to have slides. This language is, once again, simply utilized for ease in understanding, as both programs 20, 30 could organize their documents into pages or into slides (or into any other sub-documentation schema) without altering the scope of the present invention.

Once document 100 is created according to the template 110, a single page 130 is established using the arrangement of slots specified by the template 110. Utilizing the interfaces and procedures described in the priority application, a user interface is created in program V to allow the user to work with the template 110 to create the document. This user interface is created by auxiliary programming 40. Auxiliary programming 40 is designed to operate within and through each of the separate programs 20 and 30. Furthermore, the auxiliary programming 40 is able to operate independently from either program 20, 30. Thus, the auxiliary programming 40 can use the APIs of either program to request operations, perform functions, and manage and control documents. The auxiliary programming 40 can also operate on its own to manipulate documents, present user interfaces, and pass data and control signals between the programs 20, 30. In one embodiment, separate auxiliary programs operate in connection with each program 20, 30, but work with one another to provide the functions described herein.

The slots 140 in document 100 are designed to be filled with subdocuments (subfiles) found elsewhere in the system 10, such as subdocuments 122 that are stored outside the applications 20, 30. In FIG. 1, the subdocuments 122 are stored on, and are accessible to the programs 20, 30 through, a file system 120. In one embodiment, each subdocument 122 is stored in the native format of either the first program 20 or the second program 30. In FIG. 1, five subdocuments 122 are shown, each with a separate filename maintained by the file system 120. All five of these subdocuments 122 shown in FIG. 1 are stored in the native file format of program V 20. In some cases, the auxiliary program 40 provides access to a sub-portion of the overall file system 120 operating on a computer system. That sub-portion is referred to generally as a library. Thus, in FIG. 1 and elsewhere in this document, the file system 120 containing the files is also referred to as the library 120.

The user interface created by the auxiliary program 40 allows a user to insert the content of the subdocuments 122 as objects into the slots 140 in the document 100. The actual format of these objects as inserted into the slots 140 can vary between embodiments. One embodiment will be described in more detail below in which the objects embedded into the slots 140 are formatted differently than the files 122 that are stored in the file system 120. In other embodiments, program V 20 manages documents such as document 100 and subfiles 122 by maintaining separate objects within the documents 100, 122, and the embedding of a subfile 122 into a slot 140 is accomplished by simply copying the objects found in the subfile 122 into the slot 140 of the document 100.

Figure 2:
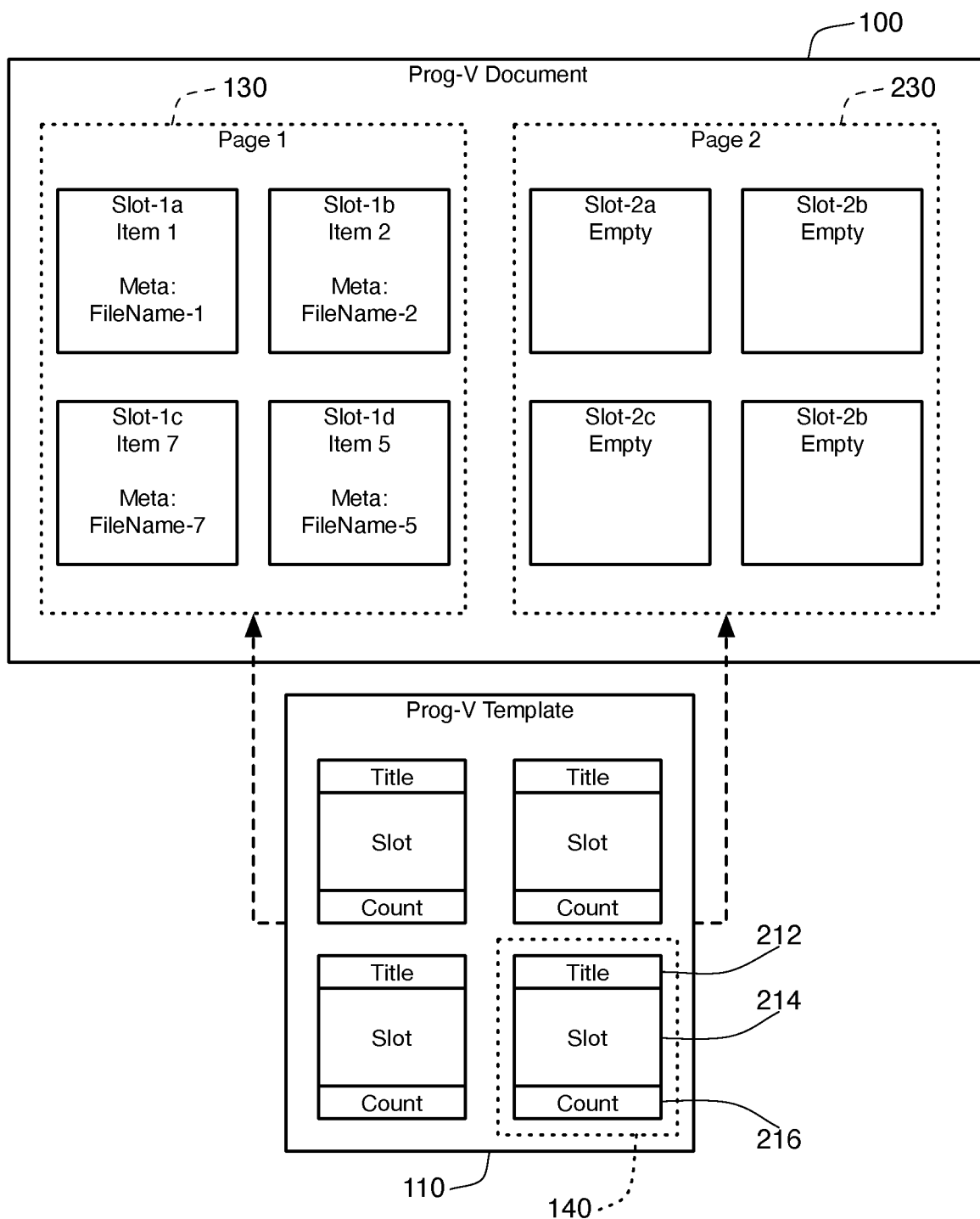
FIG. 2 is a schematic diagram showing the relationship between a template and a main document.

FIG. 2 shows document 100 after it has been expanded to a second page 230. It can be seen that both the first page 130 and the second page 230 share the same number, arrangement, and orientation of slots, as both pages 130, 230 were defined by the same template 110. FIG. 2 also shows more details of template 110. As can be seen in that figure, this four-slot template 110 actually has a title 212, a slot 214, and a count 216 at each location in the 2×2 grid it defines. Each location defines where slots 140 will be formed in the documents 100 created by this template, with each slot 140 being capable of being filled by content from the subdocuments 122. The title 212 location allows each of these subdocuments to be shown in association with a title that describes that subdocument 122. Count 216 allows the document 100 to create a count of the number of subdocuments that are contained in the document 100. The use of titles, slots, and counts are described in more detail in the incorporated priority documents.

Templates such as template 110 may be created using the user interface described in the incorporated priority documents. Users can add new elements to the template 110, with the user interface allowing the user to choose the type of element being added (either a drawing or slot 214, a title 212, or a count 216). A title 212, slot 214, and a count 216 can be grouped together so that this data will be populated together based on the subdocument 122 that is populating the slot 214.

Inserting Content Into Slots

Figure 3:
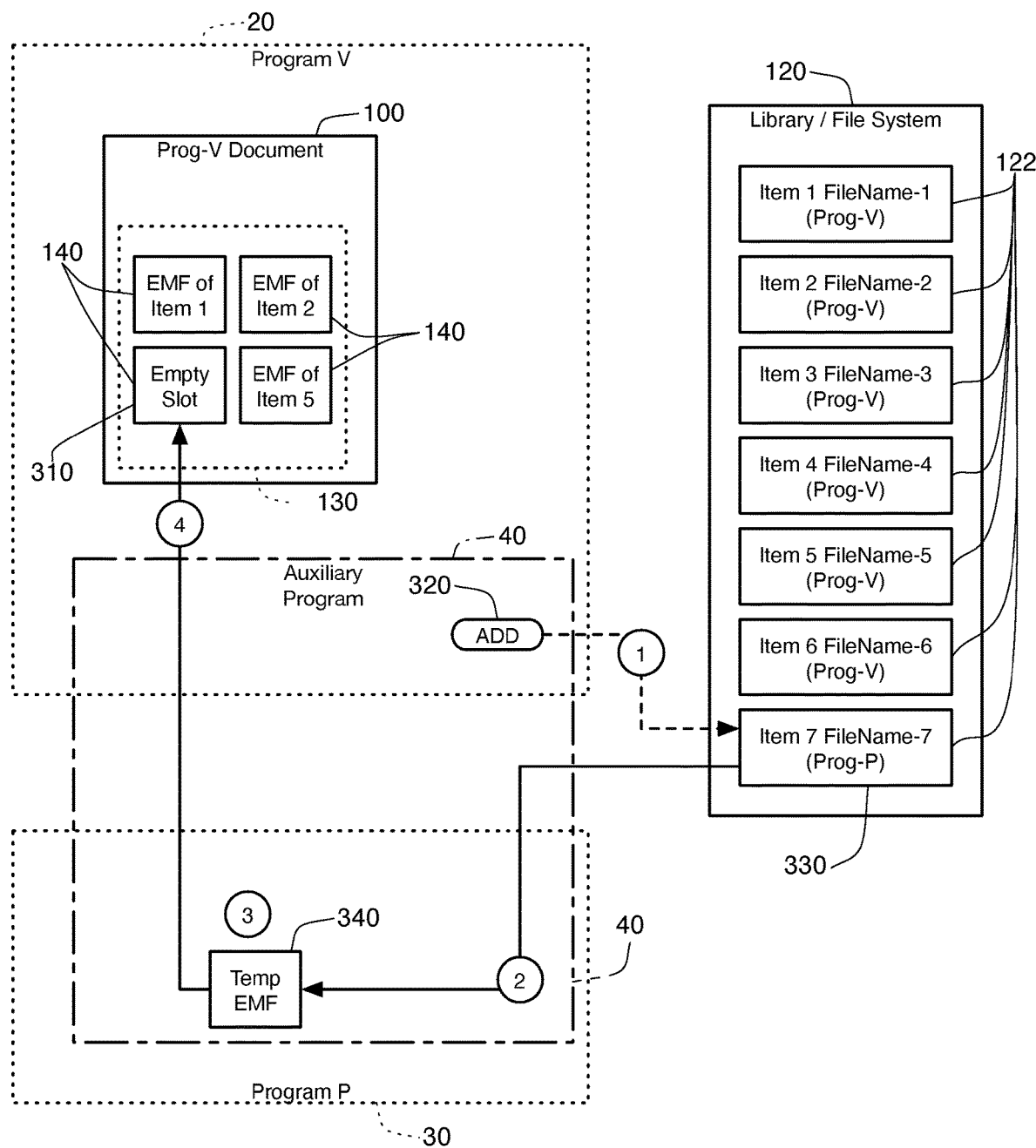
FIG. 3 is a schematic diagram showing the interaction between the two main programs, the auxiliary program, the subdocument files, and the main document.

FIG. 3 shows document 100 open within program V 20. This document 100 is shown with a single page 130. Inside that page 130 are four slots 140, with one of those slots, namely slot 310, being empty. The auxiliary program 40 operating within and in connection with Program V 20 provides a user interface to the user allowing the user to select a particular subdocument 122 in the file system 120 to add to the empty slot 310. In FIG. 3, this user interface includes an "Add" button 320. As explained in the priority documents, the user is allowed to see items in a library 120 that are available for insertion into the slots 140 of an open document 100. Once an item 122 is selected through this interface, the user may select to add 320 that document. This is the first major step in adding content from subdocument 330 into an empty slot 310, and is therefore indicated by the numeral 1 in a circle on FIG. 3.

In FIG. 3, the user has selected to add item 7, which is a document 330 in the file system 120 associated with File-Name-7. This particular document 330 is not a native document to Program V, but is instead a native document to Program P. In the context of Microsoft Visio and Power-Point, for instance, the user may be working with a Visio document 100 in the Visio program 20 and select a Power-Point document 330 to be inserted into the empty slot 310.

The slots 140 in the document 100 are associated with objects, locations, or some other type of document structure in the document 100 maintained by program V 20. In most or all cases, it will not be possible to simply insert an entire file 330 that is formatted according to the file structure of a different program 30 into the object or document structure that maintains the slot 140 in document 100. As a result, the auxiliary program 40 must take responsibility for converting content from the selected document 330 into a format that can be inserted into the empty slot 310 in the document 100. In this case, the auxiliary program 40 opens the selected document 330 in its native program, or program P 30 for document 330. This occurs at numeral 2. In the preferred embodiment, the opening and manipulation of the selected document 330 occurs in the background (a hidden window, for instance) and is not visible to the user.

The auxiliary program 40 then causes program P 30 to create an intermediate formatted document 340 (numeral 3). In this case, the intermediate format document 340 is an enhanced metafile (EMF) document. An EMF document 340 is an image format created by Microsoft. While it can be imported into various programs and exported from those programs, most programs do not easily edit EMF documents while they remain in EMF format. Nonetheless, it is this EMF document 340 that is inserted into the empty slot 310 by the auxiliary program 40 (numeral 4 in FIG. 3). This is accomplished by storing the EMF document 340 temporarily to the file system and then inserting the EMF image in that file 340 into the empty slot 310.

The other three slots 140 of document 100 in FIG. 3 are shown as containing EMF images for items 1, 2, and 5. As shown in that figure, these items are all associated with files in the file system 120, and all of these files are stored in the native format of program V 20. Nonetheless, these slots are shown as being filled with EMF formatted images, not the original, native-format documents or objects. While it is possible to store native formatted objects in these slots 140, some embodiments of the present invention store items in slots only in the intermediate (EMF) format. The rationale for this is explained in more detail below in connection with editing an item within a slot 140.

Figure 4:
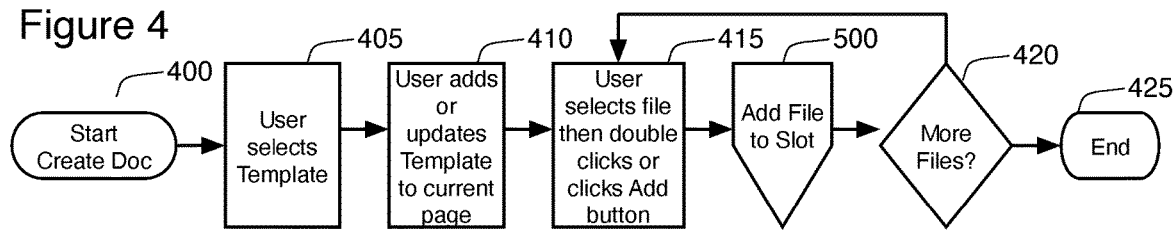
FIG. 4 is a flow chart showing a method for creating a main document.
Figure 5:
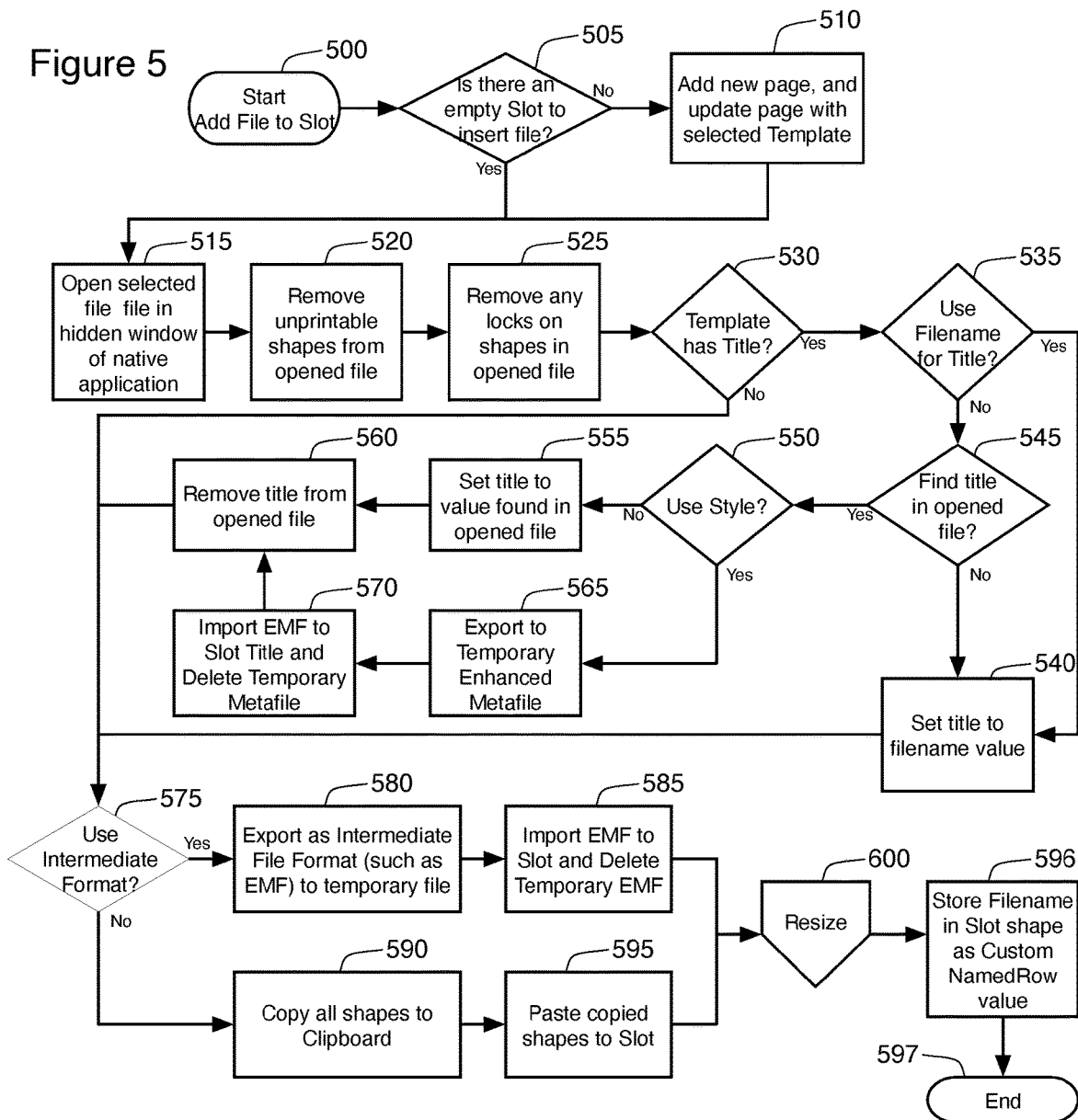
FIG. 5 is a flow chart showing a method for adding a subfile into a slot.

FIG. 4 shows a method 400 for creating a document 100, while FIG. 5 shows a method 500 for inserting data into a slot 140 of the created document 100. Method 400 begins with the step 405 of selecting a template 110 for use while the user is operating a program, such as program V 20. The preferred embodiment always requires the selection of a template 110 because it is the template that defines the slots 140 in a document. The template 110 is then applied to the current document 100 open in the program V 20. This results in the creation of a page 130 having slots 140 (with each slot 140 perhaps designed as a three-part title 212, slot 214, and count 216, as described above) at step 410. The user will then select a file, such as file 330, to add to a slot 140, such as by selecting the add button 320 or by double-clicking on a file name of a file 330 in the user interface created by auxiliary program 40 (step 415). The selected file is then added to the slot 140, which is described immediately below in connection with method 500. At step 420, the user is given the option to add more files to the slots of the created document 100. If the user desires to do so, the method 400 returns to step 415. Otherwise, the method 400 ends at step 425.

Method 500 explains the process for adding the content of a subfile 122 (such as file 330) to a slot 140 (such as empty slot 310). In one embodiment, the user interface always inserts the selected file 330 into the next available empty slot 310 on the current page 130. Thus, the first step 505 of the method 500 determines if there is an empty slot 310 available in the current page 130. If not, step 510 will create a new page (such as second page 230) in document 100 according to the previously selected template 110.

At step 515, the auxiliary program examines the selected subdocument 330, determines the native application for that document 330, and opens the document 330 in that native application in a hidden window. At step 520, the auxiliary program 40 examines the open document 330 and looks for unprintable shapes. Unprintable shapes are shapes that are not on the printable page as they are located outside the border of page If any are found, these are removed. Step 525 removes any locks on any shapes that are found in the file. Unprintable shapes can cause problems in the context of a slot 120 of document 100. In addition, locked shapes can be difficult or impossible to resize and reposition, as will be necessary once the content of the selected document 330 is inserted into the empty slot 310.

At step 530, the auxiliary application 40 will determine whether the template 110 has defined any titles 212 that must be filled in for the empty slot 310. If not, steps 535 to step 570 can be skipped. If so, step 535 will first examine to see if the filename for the selected document 330 is to be used for the title. The user can elect to use filenames as titles if they so desire. This election can be made through a preferences interface and then stored in preferences data under the control of the auxiliary program 40. If filenames are to be used, step 540 simply assigns the title 212 for the empty slot to the filename of the selected file 330. In most cases, the filetype extension will be removed from the filename before assigning the title 212. The title 212 will be displayed adjacent to the content of the selected file 330 when the document 100 is being viewed.

If the user has not elected to use the filename as the title, step 545 will examine the open document 330 in the native program and attempt to identify a title. In one embodiment, the open document 330 is examined for textual data appearing at the top, or top-center, of the open document. If such textual data is not found at step 545, the filename will be used as the title in step 540. If a title is found in step 545, step 550 determines whether the user has elected to use the formatting of the title found in the selected document 330 in the title 212 for the empty slot 310. If not (if only the text of the title is to be used), step 555 sets the title 212 to the discovered text. Step 560 then removes the title information from the open document 330. This is done because the template 110 already provides location for the title 212 outside of the container 214 for the slot, so there is no reason for the title to appear again in the image found in the slot 214. If the style from the open document 330 is to be maintained, the title portion (only) of the open document 330, including all formatting, is saved separately as a temporary EMF slot title file at step 565. This EMF file will contain not only the text of the title, but also the formatting of that text as found in the open document. The temporary EMF file is then inserted into the title 212 for the slot 140 at step 570, and the temporary EMF title file is then deleted. Step 560 will then remove the title portion of the subfile to avoid duplicating the title both in field 212 and in the image found in 214. This step essentially creates a redacted version of the subfile as the title information has been redacted.

At step 575, the auxiliary application 40 determines whether an intermediate file format (such as EMF) will be used to insert the content of the selected file 330 into the empty slot 310, or whether the native format (such as the native objects of a Visio file) will be inserted. An intermediate file format is usually necessary when the document 100 into which the content is to be inserted is of a different file format than the selected subdocument 330. In the example shown in FIG. 3, the selected file 330 is native to program P 30, while the document 100 is a native document of program V 20. This general incompatibility will require the use of an intermediate file format. In other cases, even when the selected subdocument 330 is fully compatible with the main document 110, it may, nonetheless, be desirable to use the intermediate file format. If the intermediate file form is desired, step 580 will export the content of the selected file 330 (minus unprintable shapes removed in step 520 and any title removed in step 560) into the intermediate format that is being used, such as EMF. This creates a temporary file of the correct intermediate format. At step 585, this intermediate format content will be inserted into the empty slot 310 (more particularly, into the slot object or field 214 of the slot 310).

If step 575 indicates that it is not necessary or desirable to use the intermediate file format, step 590 has the auxiliary program 40 copy the shapes or objects of the open selected file 330 and then step 595 will paste the shapes into the empty slot 310. This copy and paste operation may utilize the operating system clipboard, but this is not necessary to perform these functions.

The inserted content in the previously empty slot 310 is then resized using method 600 (described below). After resizing, step 596 will ensure that appropriate metadata about the inserted content is stored in association with this slot 310. In particular, the selected file name (FileName-7 for selected file 330) is stored in the metadata for that slot 310. The filename is preferable stored as a fully qualified name (file location) so that the original file 330 can be identified with certainty in the file system 120 and used at a later time. The metadata associated with the slot 310 is stored in the document 100 in such a way that it can be ignored by the native program V 20 if it is not operating in conjunction with the auxiliary program 40. This means that the document 100 remains fully compatible with its creating program 20 and can be opened and edited by any operating instance of the program 20 even if the auxiliary program 40 is not operating and cannot read that metadata. When the auxiliary program is operating, however, the metadata can be read, understood, and used in the methods described below. In some instances, the file format of document 100 stores metadata associated with objects within the document 100 as name/value pairs, or in other xml data structures. Microsoft PowerPoint, for instance, can store metadata as "tags." The method 500 then ends at step 597.

Figure 6:
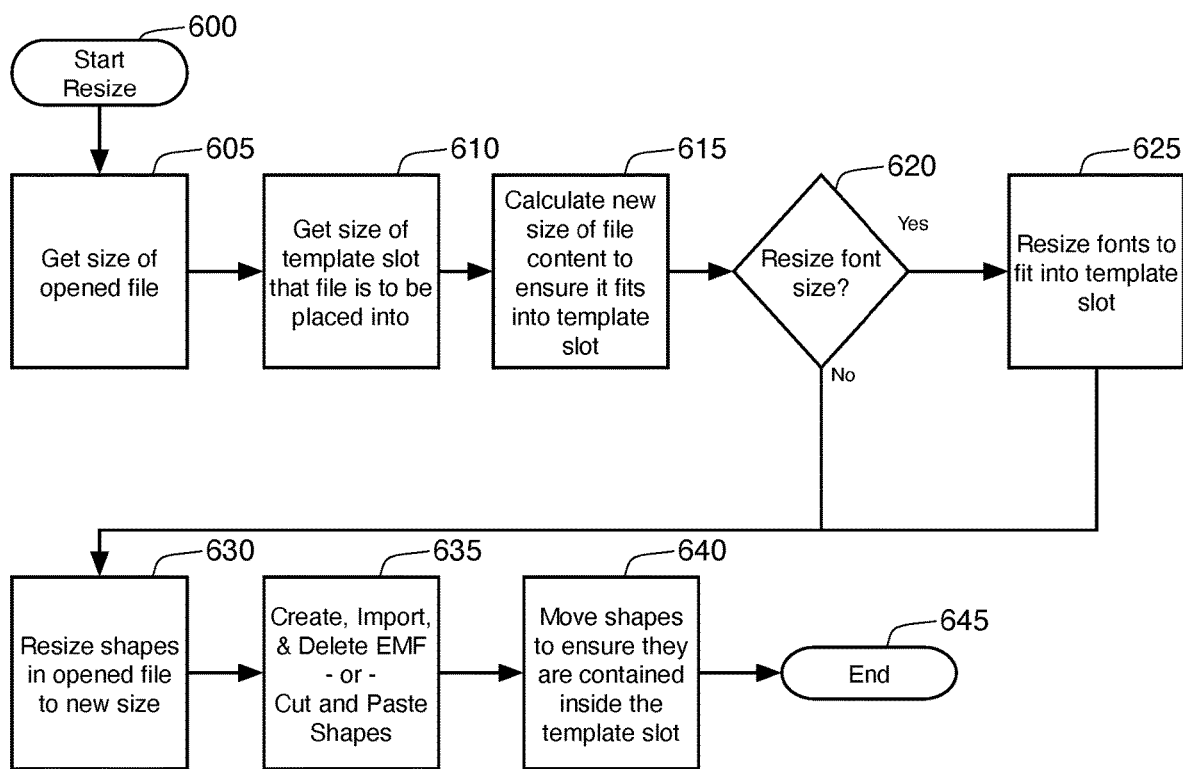
FIG. 6 is a method for resizing an inserted subdocument.

The resizing method 600 is shown in FIG. 6. In FIG. 5, the resizing method 600 was shown as a single step inside the method 500, and it occurred after the EMF or copied shapes were added into the slot 310 at steps 585 or 595. The actual method 600 is somewhat more complicated, and it include steps that may occur on the selected file 330 when it is still open in its native application. The method 600 begins at step 605 by determining the size of the opened subfile 330. The "size" of the selected file 330 is the visual size of the content of the file 330 when viewed, not the number of bits or bytes stored on in the file system 120. This size will depend on the units and other parameters of the native application that has opened the file 330. For instance, the size may be an image size and may be presented in a unit of real-world distance, such as inches or centimeters. The size may also be measured in pixels. Conversions are possible between pixels and real-world distance, but such conversion will depend on the resolution (frequently measured in dots per inch or dpi) used by the native application. This size of the content in the selected file 330 will frequently need to be reduced so that the content will fit into the dimensions of a slot 140. For instance, a single page wide original content in file 330 may be 7 inches wide (at 72 dpi), while the slot 330 in a 2×2 slot formatted template 110 may be only 3 inches wide in a 96 dpi environment. Step 615 determines the size that the file content will need to be to fit it into the empty slot 330. Step 620 determines if fonts appear in the content of the selected file 330 and, if so, they will need to be resized as part of the overall resizing method 600. If so, step 625 will calculate in font reduction (or, in some cases enlargement) and then resize the fonts as appropriate. The shapes in the selected file 330 are resized at step 630. Only at this point (step 635 in the resizing process 600) is the EMF file created and then imported (steps 580 and 585 in method 500) or are the shapes and fonts cut and pasted (steps 590 and 595). At step 640, the content that has be inserted into the previously empty slot 330 is examined to ensure that the content fits within that slot 330. Although resizing was done before at step 625 and 630, some additional alterations of size and translational movement may be necessary at step 640. The process 600 is then complete at step 645.

Editing Slot Content

As explained above, the document 100 created by most embodiments of the present invention is formatted in a way that it can be opened by its native program, such as program V 20, even if the auxiliary programming 40 is not present. This means it is possible for a user to use the native program 20 to edit the content of the document 100 in place. As explained in detail in the priority application, one of the primary benefits of the utilization of slots is to maintain the integrity of the individual subfiles or items 122 stored in the library 120. In one embodiment, any one file 122 may have been inserted into the slots 140 of numerous documents, such as document 100. In this context, it would be important to have the content of the slots in these numerous documents to be effectively the same (with some resizing and title differences depending on the template settings of the documents). If any editing is to be done on the content of a slot 140, it is preferable for that editing to occur on the original subdocument 122.

Figure 7:
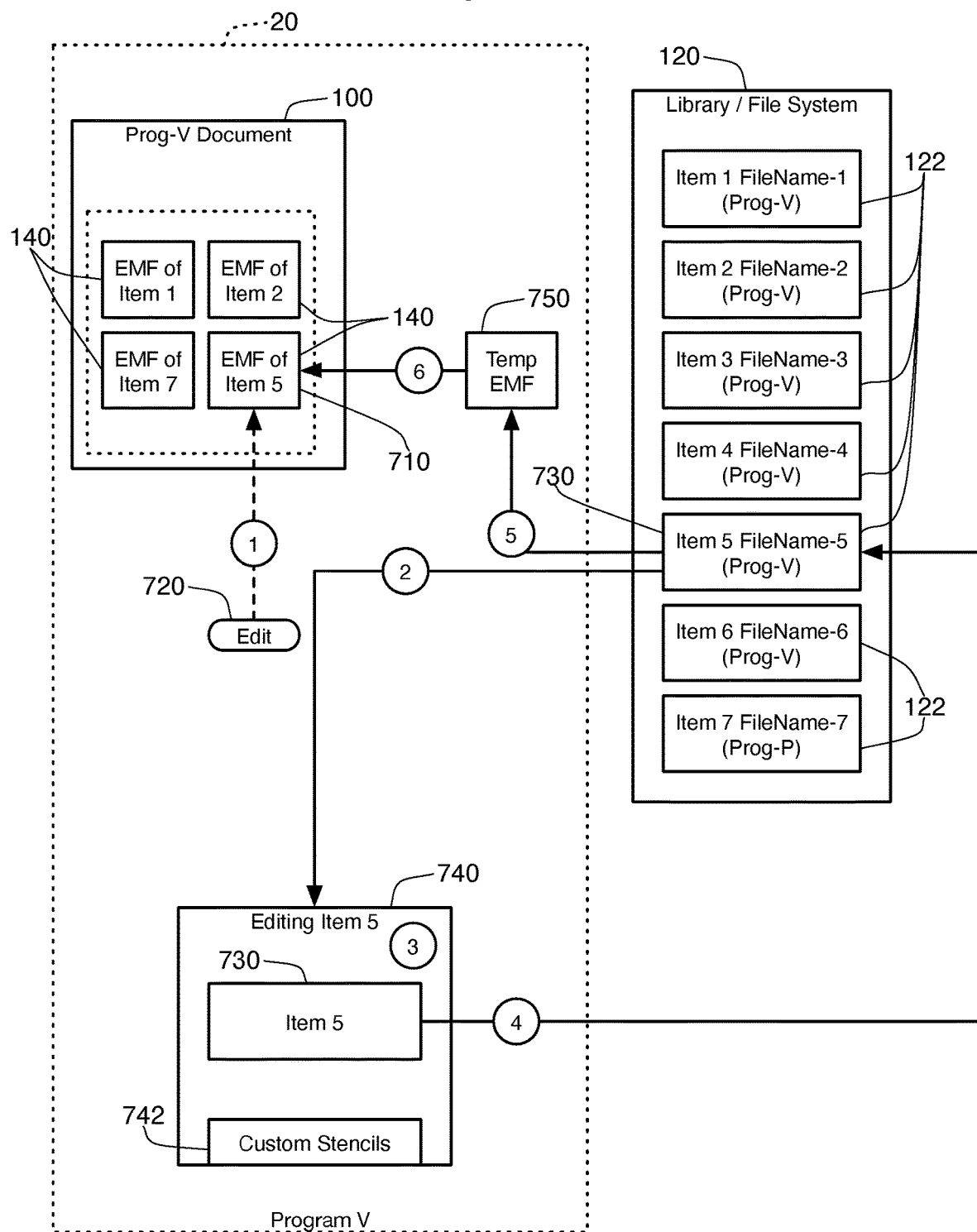
FIG. 7 is a schematic diagram showing interactions between system components when editing a subdocument.
Figure 8:
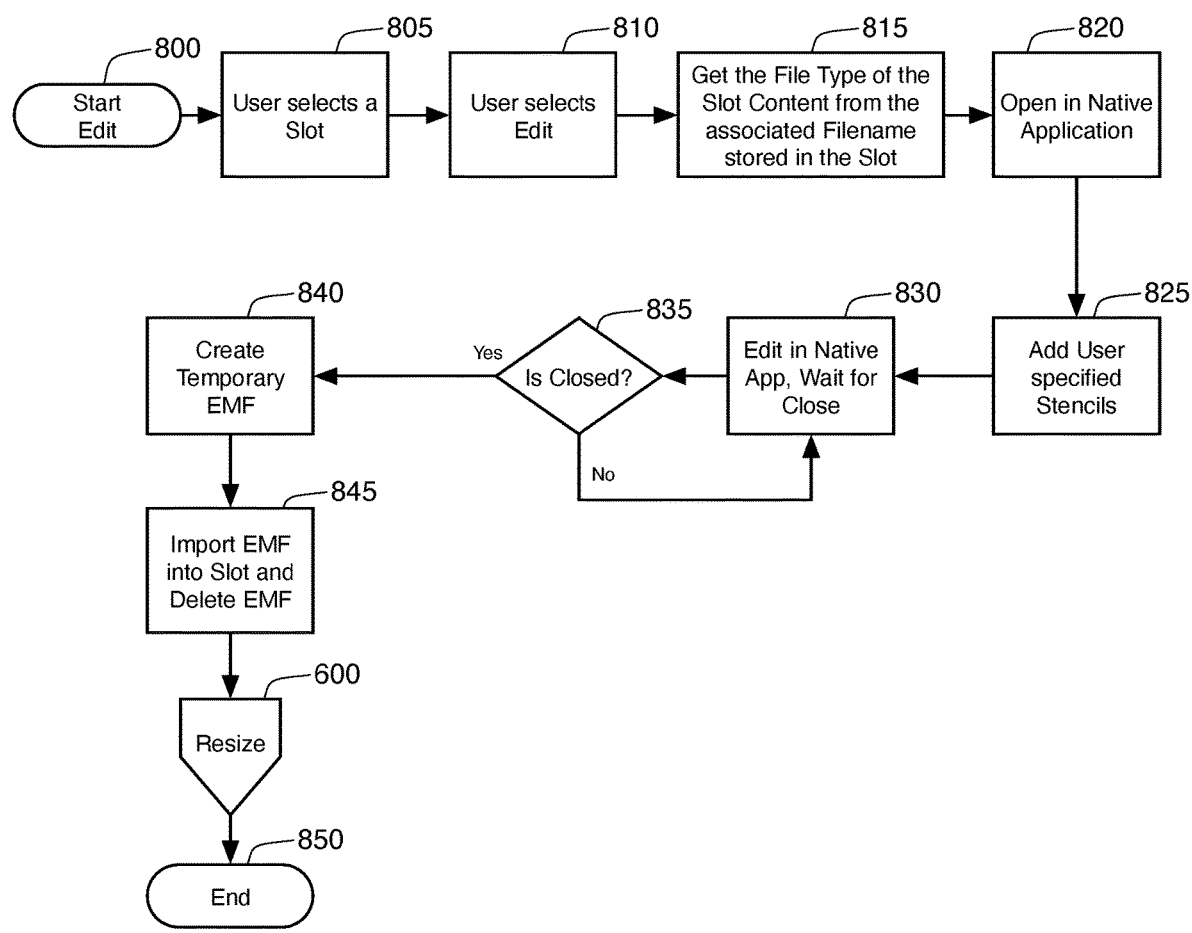
FIG. 8 is a flow chart showing a method of editing a subdocument.

The combination of FIG. 7 and the method of editing 800 shown in FIG. 8 reveal how the editing of slot contents is performed in one embodiment of the present invention. It is important to note that, in FIG. 7, while the content of each slot 140 in document 100 contains the content of files 122 found in the library 120, this content is stored in the slots 140 in the intermediate file format (such as EMF). As explained above, some of the files, including the files for Item 1, Item 2, and Item 5, all share the same native application 20 as the document 100. As a result, it was possible to simply cut and paste the content of these items into the slots 140. If this were done, it would be a simple matter for a user to directly edit the content of the slots 140 with the controls of program 20. By saving the content of these slots 140 into the intermediate format (in this case, in EMF format), editing the content of the slots 140 using the controls of program 20 is now more complicated. In most cases, any attempt to edit the slot contents will require that the intermediate format be converted into native objects for the program 20 to manipulate. In some contexts, for instance, the intermediate format is a simplified image representation of the content of the underlying files 122 that is not easily editable.

To allow editing of slot content, the method 800 starts by requiring a user to select a single slot 140 in the document 100 at step 805. Once selected, the user selects the option to edit this slot at step 810, such as by selecting the edit button 720 (shown as numeral 1 on FIG. 7). In FIG. 7, slot 710 has been selected. This slot 710 contains the content of item 5 730 in the library 120. The auxiliary programming 40 will next examine the metadata stored in association with this slot 710. This metadata was created when the slot was populated in step 596 as described above. At step 815, the auxiliary programming 40 examines the metadata, determines the file name (and the associated native application), and then opens the document in that native application in step 820 (numeral 2 in FIG. 7). In the example shown in FIG. 7, the native application is program V 20, the same program 20 that has created the main document 100. Note that while the auxiliary programming 40 is not explicitly shown in FIG. 7 (or in any later figures), the auxiliary programming 40 is nonetheless operating in these environments.

In one embodiment, the auxiliary programming 40 will add custom controls and/or stencils 742 to the user interface window 740 of the native program 20 for the selected file at step 825. These controls and stencils 742 make the job of editing the item file 730 easier, and they create custom interfaces for specialty applications and editing. In the incorporated priority documents, the customization for one particular use case is described in some detail. At step 830 (numeral 3 on FIG. 7), the user edits the selected item file 730 in the user interface 740 of the native program 20. The auxiliary program 40 will monitor this user interface window 740 during this time. In particular, the auxiliary program 40 will attempt to determine whether or not the editing window 740 has been closed by the user. This occurs at step 835. If the user has not closed the window 740, the editing process 830 will continue.

Once the editing window 740 has closed, the auxiliary program can conclude that the user has finished editing the selected item file 730. At this point, it is assumed that the edited document has been saved by the user back to the library 120 (numeral 4) using the normal editing window 740 of the native application 20. Since the editing is now complete, the auxiliary program at step 840 will retrieve the revised file 730 from the library 120 and create a temporary, intermediate format file 750 containing the revised content of the file 730 (numeral 5). This intermediate format file 750 is then imported into the same slot 710 that contained the older content from this file 730. This occurs at step 845 (numeral 6). Once completed, the temporary intermediate format file 750 is deleted. The content is then resized, such as by using method 600. The opening of the file, the creation of the intermediate format file, the inserting into the slot, and the resizing steps can all occur in the same manner described above in connection with FIGS. 5 and 6. At step 850, the method 800 ends.

Note that the above methods have discussed the creation of an intermediate file format file, such as EMF file 750. This file can be stored into non-volatile memory as a file in the file system 120. However, actually storing the file in the file system is not a necessary component of the present invention. An intermediate format "file" can be created entirely in the RAM of an operating computer, and the content of that file 750 can still be inserted into a slot 710 even if the file system never formally creates a file on the nonvolatile storage of the computer system. The deletion of such a "file" would also not require the intervention of a file system, as the embodiment of the file in RAM can simply be erased or forgotten without a file system actually deleting a stored file.

Figure 9:
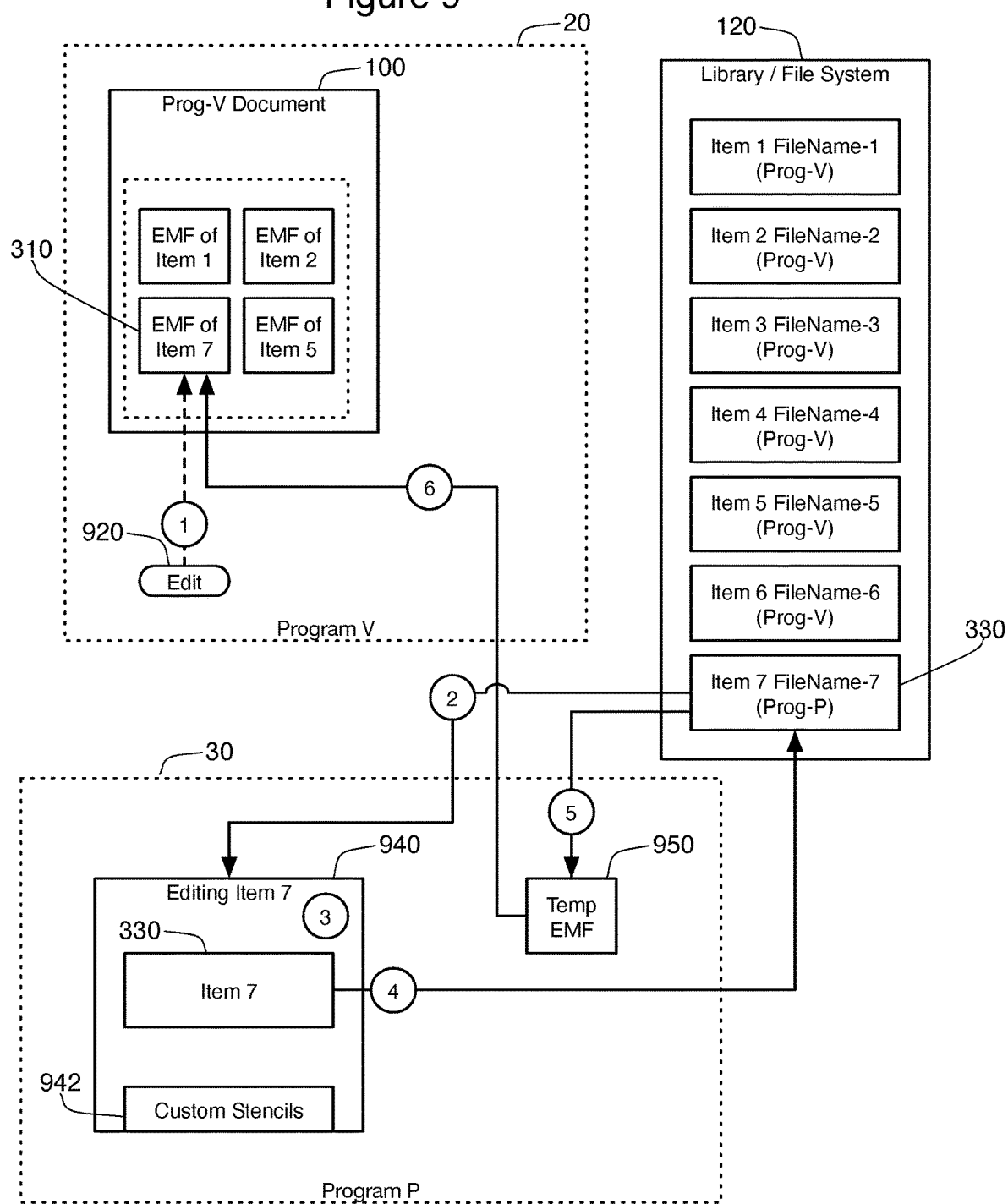
FIG. 9 schematic diagram of another embodiment showing interactions between system components when editing a subdocument.

FIG. 7 showed how the steps of method 800 are applied when the selected file 730 is of the same file format as the document 100, and therefore is opened and edited by the same application that has opened and is editing the document 100. In FIG. 9, method 800 is shown in the context where item 7 in slot 310 is selected for editing. In this case, the auxiliary program examines the metadata for slot 310 and determines that item 7 must be opened in a different program, namely program P 30. The auxiliary programming 40 does so, and then the same programming can provide custom controls and stencils 942 that are presented in the editing window 940 in program P 30. The auxiliary programming 40 still monitors this window 940 until it is closed. When it is closed, the revised item file 330 is opened again in program P 30, a temporary file 950 is created, and this file is resized and inserted into the selected slot 310 so as to replace the previous version of item 7. The temporary file 950 is then deleted.

Document Level Transformation

Figure 10:
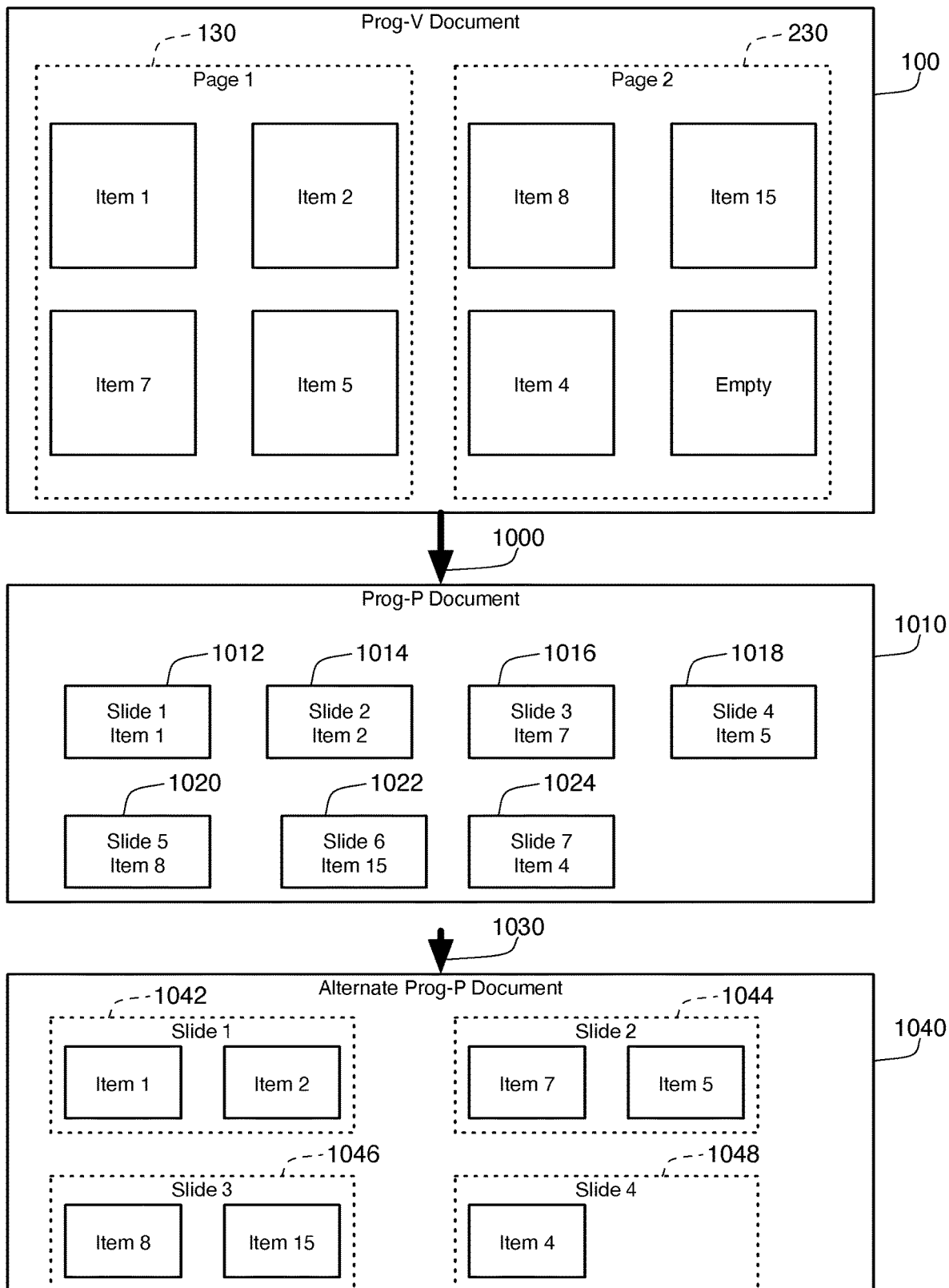
FIG. 10 is a schematic diagram showing a document transform between different application programs.

FIG. 10 shows document 100 described above, native to program V 20 and having two pages 130, 230 configured using the 2×2 grid template 110. The first page 130 contains four filled slots, while the second page 230 has three of the four slots filled. FIG. 10 shows a transformation 1000 of this entire document 100 into a differently formatted document 1010 native to a different program, namely program P 30. In this document 1010, the items found in the slots 140 of the prog v document 100 have rearranged in the prog-P document 1010. For example, while items 1, 2, 7, and 5 were all found in the slots of the first page 130 of the prog-V document, these same items 1, 2, 7, and 5 are now found (one-per-slide) in the first four slides 1012, 1014, 1016, and 1018 of the prog-P document. Similarly, items 8, 15, and 4 on page two 230 of the origin document are now find in the next three slides 1020, 1022, and 1024. This transformation 1000 changes not only the template configuration (from a 2×2 grid to a "1 up" single slot per slide), but also the overall size and the proportions of the item content. In order for this transformation 1000 to be successful, it will therefore be necessary to access the original files 122 in the library and reconfigure and resize the items for their new sizes and proportions in the resulting document 1010.

Note that FIG. 10 also shows an alternative transformation 1030 into program-P document 1040 that has a different template configuration. In this configuration, each slide shows the content from two different items in a 1×2 grid pattern. As a result, the first slide 1042 contains item 1 and item 2 content, the second slide 1044 contains item 7 and item 5 content, the third slide 1046 contains item 8 and item 15 content, and the fourth slide 1048 contains only content from item 4. Of course, different grid patterns would also be possible for the destination document.

Figure 11:
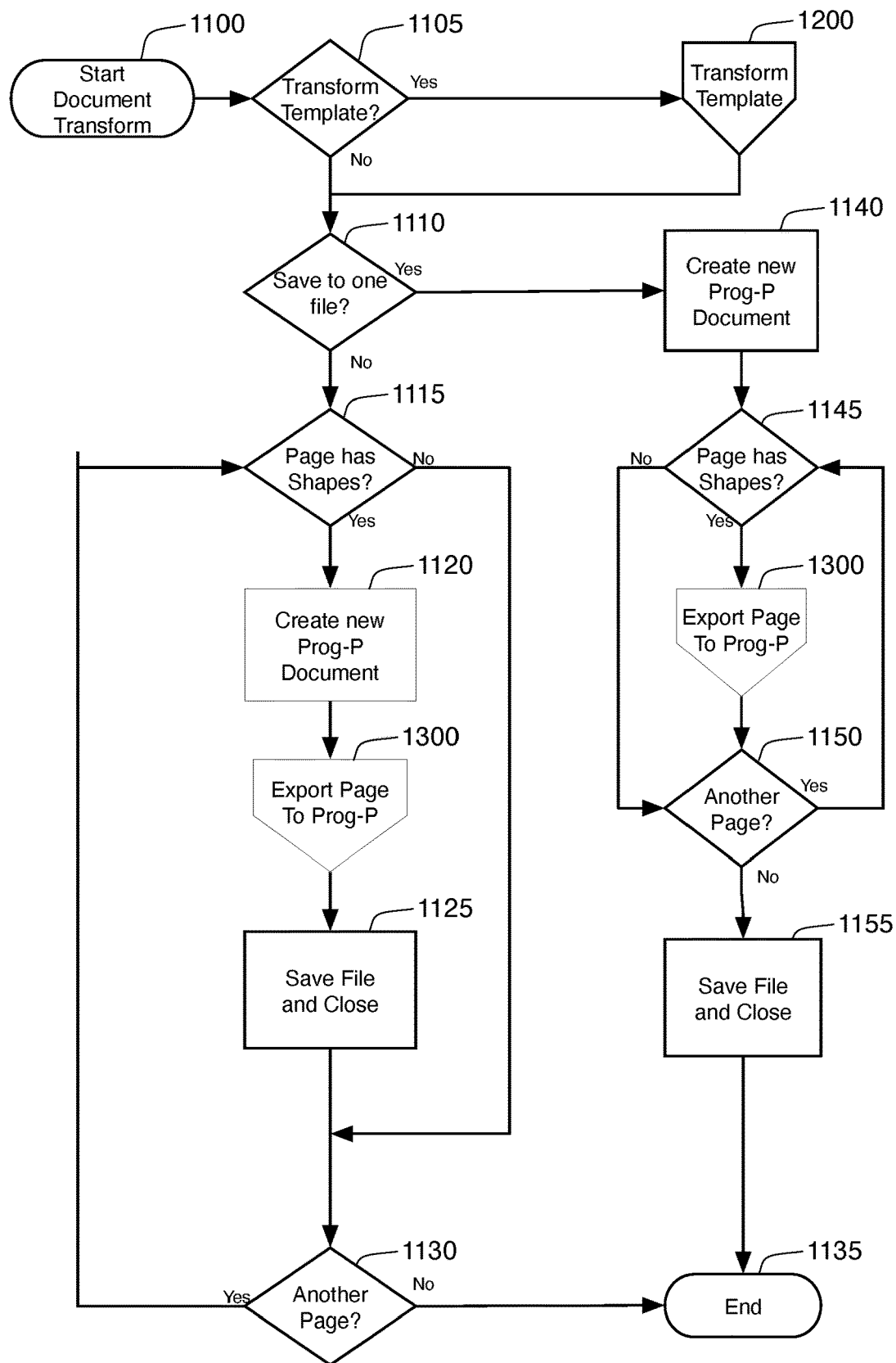
FIG. 11 is a flow chart showing a method for document transform.

The overall method 1100 to perform these types of document transformations 1000, 1030 is shown in FIG. 11. The method begins with a determination at step 1105 as to whether the destination document 1010 (or alternative document 1040) will utilize a different template configuration than the original document 100. For example, the switch from four items per page in document 100 to one item per slide (page) in document 1010 indicates a template change, as does the switch to two per slide in document 1040. If a template change is required, the transform template method 1200 is performed.

Figure 12:
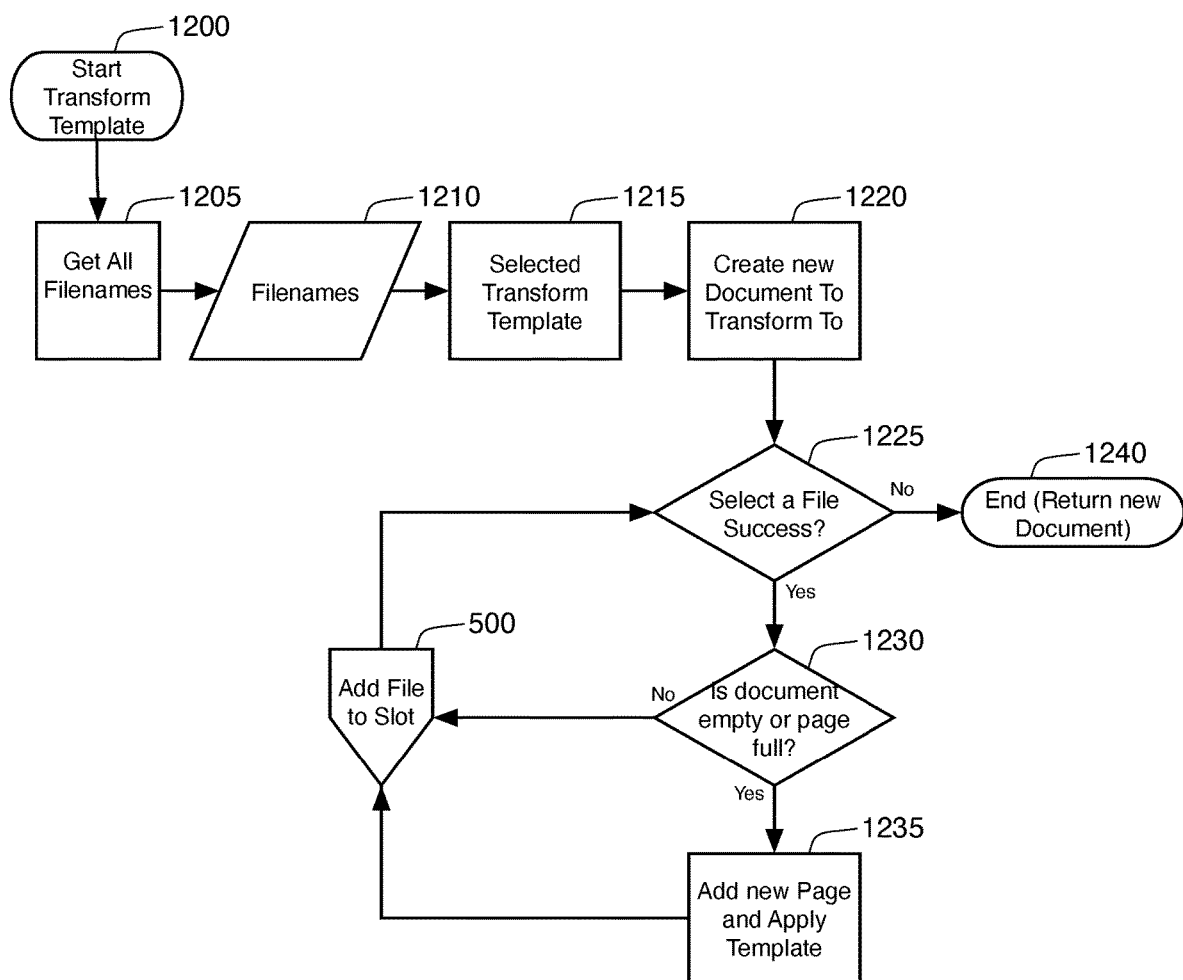
FIG. 12 is a flow chart showing a method for creating a transform template document.

The transform template method 1200 is shown on FIG. 12. The method starts by determining all of the filenames of all items inserted into slots 140 in the original document 100. This is determined by examining, for each page 130, 230 in the document 100, the metadata for every slot 140 to create a list of filenames for the items in the library 120 used in document 100. These filenames are shown as data 1210 in the flowchart of FIG. 12. The order of these filenames 1210 is the same order in which the subfiles were presented in the original document. Next, a template appropriate for the desired destination file 1010, 1040 is selected as the transform template at 1215. In the context of FIG. 10, the transform template would be a one slot per page/slide template with the slots being in a wide, landscape orientation for destination document 1010, and the transform template would be two slots per slide, side-by-side in a 1×2 grid pattern, for destination document 1040. At step 1220, a new document is created using that selected transform template. Note that this new document is being created in the source or original program, or program V 20 in the context of FIG. 10.

Step 1225 selects a first file from the filenames 1215 to be processed. At step 1230, the document created at step 1220 is examined to see if a new page needs to be created, which would be the case if there were no pages (the document is empty) or if all the slots 140 in the current page were full. If a new page is needed, it is created at step 1235. Once a page is established that has an open slot, the content of the file selected at step 1225 is then inserted into that slot. This is accomplished using the process 500 described above. Step 1225 is then used to select the next filename from the list of filenames 1210. If all of the files have been inserted, the process ends at step 1240 and the newly created transform document is returned to method 1100.

This new document created through method 1200, or the original document 100 (if step 1105 indicated that the current template for the original document 100 was appropriate), will then be used by method 1100 as the source document to complete the document transformation. The next step 1110 is to determine whether all of the slides/pages of the destination document 1010, 1040 will be saved in a single file, or whether separate files should be created for each page. The process is similar in either case.

Step 1115 will follow if it is determined that each slide/page will appear in a separate document. Step 1115 ensures that the current (first page) of the source document has content (shapes) that needs to be exported. If not, there is no need to transform this page. If so, a new document for the destination application (in this case, program P 30) is created at step 1120. The entire page is then exported into this new document using method 1300.

Figure 13:
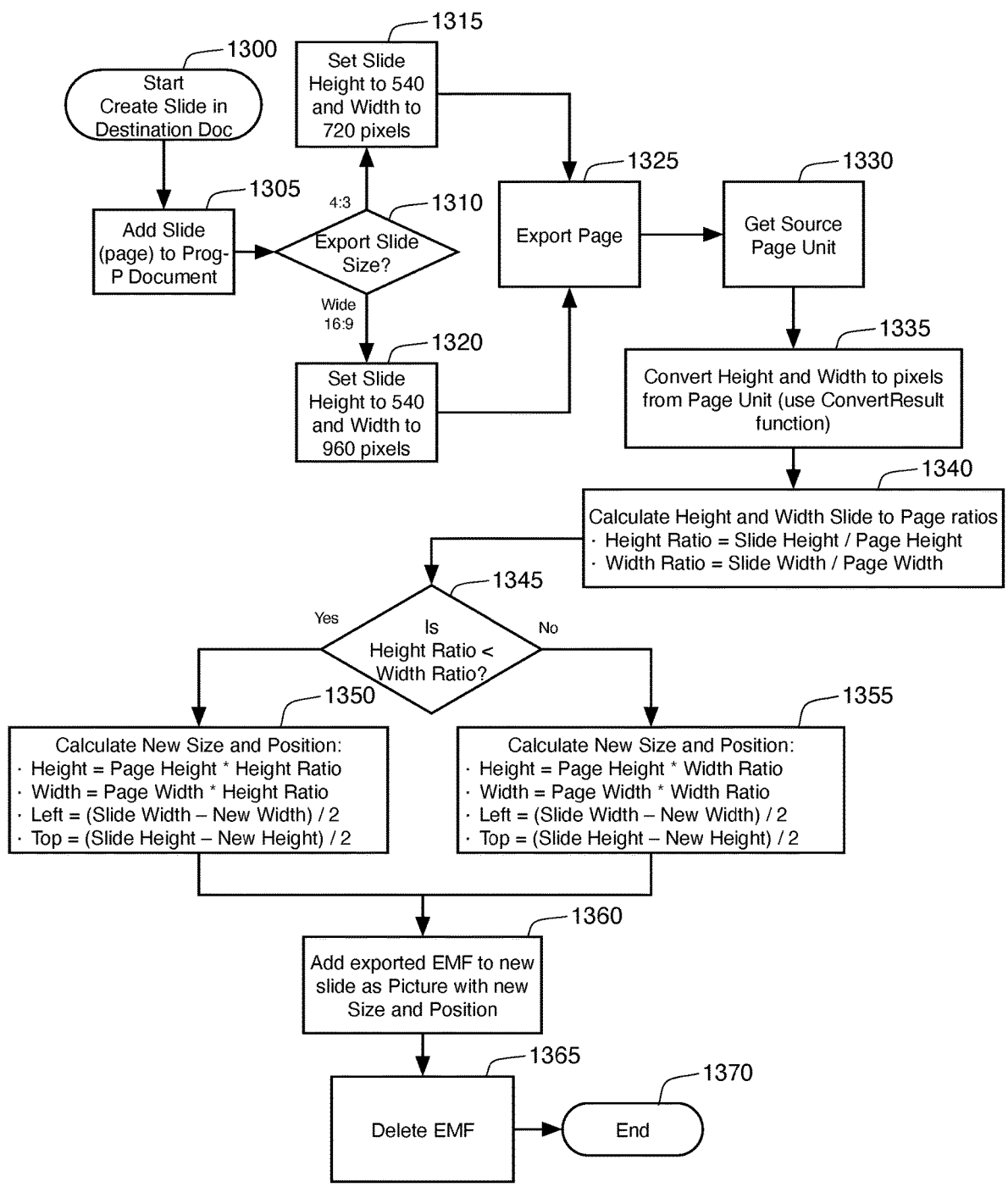
FIG. 13 is a flow chart showing a method for exporting a page from the transform template document during a document transform.

Method 1300 is shown in FIG. 13. The method starts by ensuring that the new document (such as the document created at step 1120) has an active page or slide. If not, a new page or slide is created in the document at step 1305. Step 1310 is shown in FIG. 13 assuming that the destination document 1010, 1040 is a presentation application that creates slides, and that these slides are generally presented in a landscape format. Thus, step 1310 asks whether the resulting slides are normal landscape slides using a 4:3 aspect ratio, or a wide landscape slide with a 16:9 ratio. If it is a 4:3 ratio that will be used, step 1315 sets the height of each slide to 540 pixels and the width to 720 pixels. If a 16:9 ratio is determined, then the height is 540 and the width is 960 pixels. If the destination document were not a native document for a presentation program 30, other pixel sizes and page options would be determined appropriate for the page/slide of the destination document. Regardless, steps similar to those shown as steps 1310-1320 will be used to determine an appropriate size for the destination page or slide.

Once the destination size is determined, the identified page in the source document (such as the page identified in step 1100) is exported from the source application to a temporary intermediate format file (the EMF file) file at step 1325. Note that it is the entire page, such as page 130 or page 230, that is exported into the intermediate format file, not merely a single slot 140 from the document. Also note that this step of exporting the EMF file 1325 could have occurred earlier than this location in the overall method 1300, such as before creating the slide at step 1305, or it could have occurred later in the method 1300, such as immediately before step 1360.

It is necessary to determine how to resize the entire page of this intermediate format file into the destination size identified at steps 1315 or 1320. To do this, we first examine the page units (such as inches or centimeters) of the exported source document content in EMF (the intermediate format) format in step 1330, and then convert the height and width of that content specified in these page units into a height and width in pixels. If the source document is native to a Microsoft application such as Visio, the ConvertResult function provided by the API can be used to perform this conversion.

We now have both the height and width (in pixels) of the exported EMF content (from step 1325) and the height and width of the destination page/slide (from steps 1315 or 1320). Step 1340 then calculates the ratio between the slide and the exported EMF content for both the height and the width. The height ratio is the height of the slide divided by the height of the exported EMF content, while the width ratio is the width of the slide divided by the width of the exported EMF content. These two ratios are then compared to determine which is the largest in step 1345. The larger ratio will be used to create the new size and position for the EMF content when it is imported into the slide. If the height ratio is largest, step 1350 will set the height and width for the EMF content to be the page height and width times the height ratio. If the width ratio is largest, step 1355 will set the height and width for the EMF content to be the page height and width times the width ratio. In either case (step 1350 or 1355), the left margin will be the slide width minus the calculated width divided by two and the top margin will be the slide height minus the calculated height divided by two. These calculations will ensure that the exported EMF page content will be centered and resized to the maximum possible size in the destination slide.

The exported intermediate format content (the EMF content) from step 1325 is then imported as the entire slide (as an EMF image) at step 1360. Note that the EMF file is treated as a single image, and this imported image will be resized and positioned so that it has the height, width, and position identified in steps 1350 or 1355. This image will have the template configuration of items as desired in the destination document 1010, 1040, because this template was utilized to create the EMF file through method 1200. This new image may need to be altered even after import to make sure that the imported image is of the appropriate size and properly centered. While steps 1310-1355 attempted to perfect the import through these import calculations, some issues can only be addressed after importation into the destination application 30. Once imported into the destination file, the destination application 30 under the control of the auxiliary application 40 can detect miscentering and slight miscalculations in size and fix these minor issues.

Once imported, the temporary file that was created for the image exported is deleted at step 1365, and method 1300 ends at step 1370. Note that the content that is imported contains all of the items to be found on a single slide. In the context of the alternative destination document 1040, Item 1 and Item 2 are combined into a single image and are inserted as a EMF picture into slide 1 1082. There are no "slots" that contain data linked to the files 122 in the destination documents 1010, 1040. In effect, the intricacies of maintaining slots and metadata links to the original files 122 in the library 120 are abandoned during a document transformation under methods 1100-1300. This serves multiple purposes, but the most important is to increase the speed of the document transformation and to reduce the complexity and file size of the destination documents 1010, 1040.

Returning to FIG. 11, once the page has been exported through method 1300 into the newly created document from step 1120, the revised document is saved and closed at step 1125. Step 1130 then determines if other pages need to be created. If so, the process returns to step 1115. If not, the process ends at step 1135.

If step 1100 indicated that the destination document is to save all the created pages/slides into a single document, then step 1140 will create that document. Step 1145 will then examine the first page in the source document. If there is content (shapes) on that page, then method 1300 is called to export that page to the destination document 1010, 1040. Step 1150 then determines if other pages need to be examined and exported in the source document. If so, the process returns to step 1145. Note that step 1305 is responsible for creating multiple slides (pages) in this document as needed. If no other pages are discovered at step 1150, the step 1155 will save and close the multi-page/slide destination document 1010, 1040, and the process 1100 will end at step 1135.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method comprising:
   a) identifying a source document in a program having a source page containing a plurality of slots arranged in a first grid pattern, where at least one slot:
      i) is associated with a single subfile,
      ii) contains source subfile content from the single subfile in an intermediate file format, and
      iii) has metadata identifying a file location for the single subfile;
   b) receiving a request to edit a selected slot associated with a selected subfile;
   c) identifying the file location in the metadata for the selected subfile;
   d) opening the selected subfile found at the file location in a window in a native application for the selected subfile;
   e) allowing a user to edit the selected subfile by monitoring the window and detecting when the window is closed;
   f) upon detecting the window is closed, opening an edited version of the selected subfile found at the file location in the native application;
   g) creating edited subfile content in the intermediate file format using the native application;
   h) inserting the edited subfile content into the selected slot; and
   i) deleting the edited subfile content.

2. The method of claim 1, wherein the edited subfile content is stored in a file system when created and deleted from the file system when deleted.

3. The method of claim 1, wherein the native application is the program.

4. The method of claim 1, wherein the native application is a second program different than the program.

5. The method of claim 1, wherein the steps of creating the edited subfile content and inserting the edited subfile content into the selected slot further comprises substeps of:
   i) identifying that a slot title is associated with the selected slot,
   ii) examining the edited subfile content to identify a content title in the edited subfile content,
   iii) inserting the content title into the slot title associated with the selected slot,
   iv) removing the content title from the edited subfile content to create redacted subfile content,
   v) creating the edited subfile content in the intermediate file format using the redacted subfile content, and
   vi) inserting the edited subfile content into the selected slot.

6. The method of claim 5, wherein the substeps further comprise removing unprintable shapes from the redacted subfile content before creating the edited subfile content.

7. The method of claim 5, wherein the content title is inserted into the slot title in text-only format.

8. The method of claim 5, further comprising creating a title file in the intermediate file format using formatting associated with the content title, further wherein the step of inserting the content title into the slot title further comprises inserting the title file into the slot title and then deleting the title file.

9. A method comprising:
   a) identifying, in a source document program operating on a computer system, a source document having a source page containing a plurality of slots arranged in a first pattern, where at least one slot:
      i) is associated with a single subfile,
      ii) contains source subfile content from the single subfile in a file format, and
      iii) has metadata identifying a file location for the single subfile;
   b) receiving, in the source document program, a request to edit a selected slot associated with a selected subfile;
   c) identifying the file location in the metadata for the selected subfile;
   d) opening the selected subfile found at the file location in a window in a native application for the selected subfile, wherein the native application is different than the source document program;
   e) allowing a user to edit the selected subfile within the native application while monitoring the window and detecting when the window is closed;

f) upon detecting the window is closed, opening an edited version of the selected subfile found at the file location in the native application;

g) creating edited subfile content in the file format using the native application;

h) inserting the edited subfile content into the selected slot in the source document; and i) deleting the edited subfile content.

10. The method of claim 9, further comprising resizing content in the selected subfile.

11. The method of claim 10, further wherein the resizing of content comprises resizing shapes in the selected subfile while not resizing fonts in the selected subfile.

12. The method of claim 11, wherein the resizing of content occurs before creating the edited subfile content in the file format.

13. The method of claim 12, wherein the edited subfile content is subject to translational movement.

14. The method of claim 9, wherein the steps of creating the edited subfile content and inserting the edited subfile content into the selected slot further comprises substeps of:

i) identifying that a slot title is associated with the selected slot, ii) examining the edited subfile content to identify a content title in the edited subfile content, iii) inserting the content title into the slot title associated with the selected slot, iv) removing the content title from the edited subfile content to create redacted subfile content, v) creating the edited subfile content using the redacted subfile content, and vi) inserting the edited subfile content into the selected slot.

15. The method of claim 14, wherein the substeps further comprise removing unprintable shapes from the redacted subfile content before creating the edited subfile content.

16. The method of claim 14 wherein the content title is inserted into the slot title in text-only format.

17. The method of claim 14, further comprising creating a title file using formatting associated with the content title, further wherein the step of inserting the content title into the slot title further comprises inserting the title file into the slot title and then deleting the title file.

* * * * *